US011204039B2

United States Patent
Gauss et al.

(10) Patent No.: US 11,204,039 B2
(45) Date of Patent: Dec. 21, 2021

(54) ARRANGEMENT OF AN IMPELLER WHEEL ON AN ELECTRIC MOTOR AND METHOD FOR PRODUCING THE SAME

(71) Applicant: Ziehl-Abegg SE, Künzelsau (DE)

(72) Inventors: Tobias Gauss, Niedenrhall (DE); Andreas Gross, Kirchensall (DE); Stefan Roessler, Rosengarten (DE)

(73) Assignee: Ziehl-Abegg SE, Kunzelsau (DE)

( * ) Notice: Subject to any disclaimer, the term of this patent is extended or adjusted under 35 U.S.C. 154(b) by 178 days.

(21) Appl. No.: 15/502,656

(22) PCT Filed: Aug. 4, 2015

(86) PCT No.: PCT/DE2015/200435
§ 371 (c)(1),
(2) Date: Feb. 8, 2017

(87) PCT Pub. No.: WO2016/019962
PCT Pub. Date: Feb. 11, 2016

(65) Prior Publication Data
US 2017/0234322 A1    Aug. 17, 2017

(30) Foreign Application Priority Data
Aug. 8, 2014 (DE) .................... 10 2014 215 817.6

(51) Int. Cl.
*F04D 29/26* (2006.01)
*F04D 29/32* (2006.01)
(Continued)

(52) U.S. Cl.
CPC ......... *F04D 29/263* (2013.01); *F04D 25/064* (2013.01); *F04D 29/329* (2013.01);
(Continued)

(58) Field of Classification Search
CPC .... F04D 25/06; F04D 25/064; F04D 25/0613; F04D 25/0606; F04D 29/263; F04D 29/329
See application file for complete search history.

(56) References Cited

U.S. PATENT DOCUMENTS 9,624,941 B2 *  4/2017  Dymond ................. F04D 29/02
2004/0012632 A1  1/2004  King et al.
(Continued)

FOREIGN PATENT DOCUMENTS

DE   10 2004 031 852 A1    1/2006
DE   10 2005 006184 A1     8/2006
(Continued)

*Primary Examiner* — Devon C Kramer
*Assistant Examiner* — David N Brandt
(74) *Attorney, Agent, or Firm* — McDonnell Boehnen Hulbert & Berghoff LLP

(57) ABSTRACT

An arrangement of an impeller (1) on an electrical motor, in particular on an external rotor motor (8), whereby the torque of the motor is transferred to the impeller (1) by means of a torsion-proof connection between the rotor (8) of the motor and the impeller (1) and/or its impeller hub (3), is characterised in that the connection of the impeller (1) to the motor (8) results from physical and/or chemical interactions between an adhesive medium (10) and the contact surfaces (5) of the impeller hub (3) and of the motor (8), which face each other, whereby the adhesive medium (10) fills, at least partially, an intermediate space (9) that is formed between the impeller (1) and the motor (8) by the given play.

16 Claims, 3 Drawing Sheets

Figure 1:
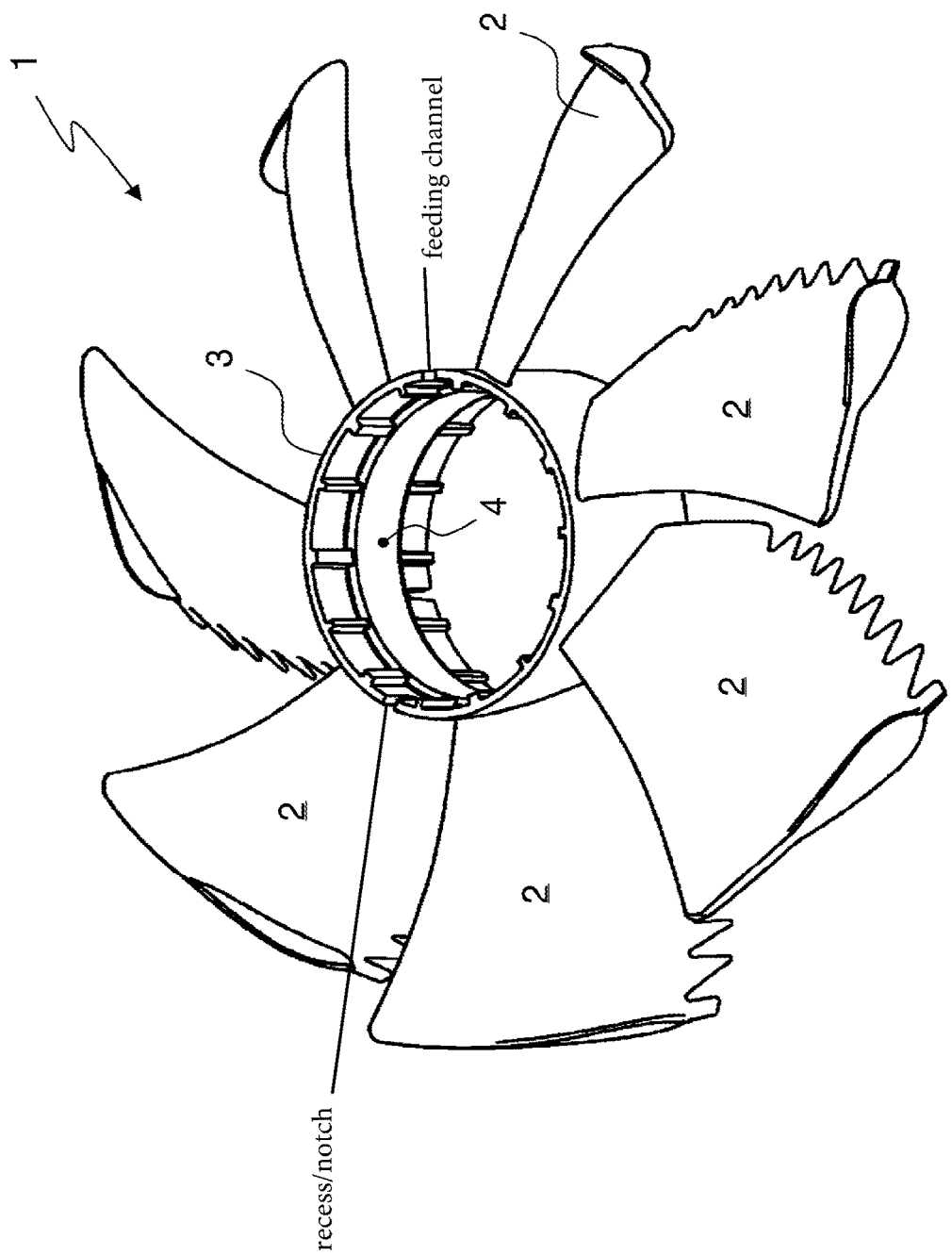

(51) Int. Cl.
  *F04D 29/62* (2006.01)
  *F04D 29/64* (2006.01)
  *F16D 1/068* (2006.01)
  *F04D 25/06* (2006.01)

(52) U.S. Cl.
  CPC ......... *F04D 29/626* (2013.01); *F04D 29/646* (2013.01); *F16D 1/068* (2013.01)

(56) References Cited

U.S. PATENT DOCUMENTS

| | | |
|---|---|---|
| 2004/0126232 A1 | 7/2004 | Lin et al. |
| 2010/0215505 A1* | 8/2010 | Takeshita ............ F04D 25/0613 416/223 R |
| 2011/0044810 A1* | 2/2011 | Ions .................... F04D 29/0563 415/229 |
| 2012/0000418 A1 | 1/2012 | Huang |
| 2012/0014806 A1 | 1/2012 | Mockridge |
| 2014/0183777 A1 | 7/2014 | Ions |

FOREIGN PATENT DOCUMENTS

| | | |
|---|---|---|
| DE | 10 2005 030 424 A1 | 1/2007 |
| DE | 10 2008 050850 A1 | 5/2009 |
| WO | 2010025732 A2 | 3/2010 |

* cited by examiner

ARRANGEMENT OF AN IMPELLER WHEEL ON AN ELECTRIC MOTOR AND METHOD FOR PRODUCING THE SAME

This application is a U.S. National Phase Application pursuant to 35 U.S.C. § 371 of International Application No. PCT/DE2015/200435 filed Aug. 4, 2015, which claims priority to German Patent Application No. 10 2014 215 817.6 filed Aug. 8, 2014. The entire disclosure contents of these applications are herewith incorporated by reference into the present application.

The invention relates to an arrangement of an impeller on an electrical motor, in particular on an external rotor motor and/or external rotor, whereby the torque of the motor is transferred to the impeller by means of a torsion-proof connection between the rotor of the motor and the impeller and/or its impeller hub. Moreover, the invention relates to a method for producing an arrangement of this type.

The terms, "impeller" and "external rotor motor" and/or "external rotor", shall be understood in the broadest sense. Specifically, the impeller can be the vane (axial impeller) of a fan, whereby the vane is connected to the rotor in torsion-proof manner (cf. DE 10 2011 015 784 A1). Instead of an axial impeller, the impeller can just as well be designed as a radial impeller and/or diagonal impeller.

According to the prior art known from practice, the impellers (axial impellers and radial impellers) are pressed onto a motor and/or external rotor motor (EC/AC) in order to transfer the torque of the drive, i.e. of the external rotor motor, to the impeller. The torsion-proof connection between the impeller and the rotor is usually generated by means of a press-fit or a screw connection. If a press-fit is implemented, a circular blank made of steel is used to establish a secure connection. The circular blank is produced by means of a progressive tool and is inserted into the impeller tool prior to the injection moulding process. Accordingly, an additional part, namely the sheet metal circular blank, is required, which is associated not only with cost of materials, but also with tool costs due to the special production procedure.

In view of the explanations provided above, it is the underlying object of the invention to design an arrangement of said generic type and a method for the production thereof and to develop both appropriately such that a secure rotary connection between an impeller and an electrical motor can be implemented without any need for additional parts and with the production process being simple.

The aforementioned object is met with regard to the arrangement by the features of claim 1 and with regard to the method by the features of independent claims 15 and 16.

The arrangement according to the invention is characterised in that the connection of the impeller to the motor results from physical and/or chemical interactions between an adhesive medium and the contact surfaces of the impeller hub and of the motor, which face each other, whereby the adhesive medium fills, at least partially, an intermediate space that is formed between the impeller and the motor by the given play.

It has been recognised, according to the invention, that the use of a sheet metal circular blank, which is common according to the prior art, is not required and that a secure connection of the impeller to the motor can be established by utilising physical and/or chemical interactions between an adhesive medium and the contact surfaces of the impeller hub and the motor, which face each other. Accordingly, a direct secure connection is established between the impeller and the motor, whereby the adhesive medium fills, at least partially, an intermediate space that is formed between the impeller and the motor by the given play.

The connecting technology hitherto implemented according to the prior art necessitated, aside from the inclusion of the sheet metal circular blank in the impeller, that the play between the motor and the impeller to be applied and/or the impeller hub is implemented to be as small as possible for the press-fit to act properly. In this context, the sheet metal circular blank provides for the mechanical stability and/or strength of the impeller in circumferential and axial direction.

Deviating from the time-proven use of the sheet metal circular blank and overcoming a prejudice among experts in this field with regard to solely adhesive connections, presently the presence of some play between the impeller and the motor is accepted deliberately, specifically it is defined to result in the intermediate space between the internal surface of the impeller hub and the surface of the motor. Said intermediate space is filled, totally or partially, with the adhesive medium such that a nearly tension-free connection between the impeller and the motor is established, namely by the intervention of the adhesive medium. Accordingly, there is no need to stabilise the impeller hub by means of a metal ring or the like. The intermediate space can be designed as an annular space.

The intermediate space formed between the impeller hub and the motor can be a gap in the range of 0.05 mm to 3 mm, preferably a gap in the range of approximately 0.5 mm. Said gap must be sufficiently large to allow it to take up the adhesive medium taking into consideration the viscosity thereof, and large enough to securely transfer the forces that arise in this process.

On principle, it is conceivable to apply the impeller to the motor without specific centring and to attach it there by means of the adhesive medium. However, in the absence of a centring, the operation of the device would be associated with imbalances that would need to be counteracted by balancing the impeller. The requirements related to the so-called balancing quality are a function of the weight and maximum rotational speed of the impeller.

To prevent imbalances, it is advantageous to form at least 3, preferably 5 or more, axial centring fins on the contact surface of the impeller hub. Said centring fins could define, through an imaginary circular ring surface, approximately the same diameter or a smaller diameter than the motor such that they are deformed, at least to a small degree, when the impeller is being pushed onto the motor. A centring with a certain form-fit/force-locking is thus being implemented.

It is conceivable just as well that the impeller hub has an internal cross-section that deviates from a circular ring-shaped internal cross-section, for example in the form of a polygon, etc. The internal regions thus formed serve for centring on the motor as they form the tangents to an imaginary circle of identical or at least slightly smaller internal diameter than the diameter of the motor. In the assembled state of the arrangement, the corners are filled, at least partially, with adhesive medium. Again, a centring is effected in ideal fashion and a sufficient amount of adhesive medium reaches the space between the impeller hub and the motor, whereby said space is to be understood in the broadest sense, namely with different cross-sectional shapes.

The connection between the impeller hub and the adhesive medium can be provided such as to exist over the entire contact surfaces or in part and/or in zones of the intermediate space. Accordingly, it is conceivable to provide something like adhesive beads between the contact surfaces. Gluing involving the entire surface is advantageous as it promotes the strength.

The adhesive medium can be a one-, two- or multi-component adhesive. The term, "adhesive", shall also be understood in the broadest sense. In any case, the generated adhesive medium establishes a connection to the contact surfaces by means of adhesion and/or diffusion and/or chemical reaction.

Due to the connection being solely by adhesion, the resulting interfacial energy between the adhesive medium and the corresponding surface needs to be lower than the sum of the surface energies. The connection is promoted if diffusion takes place, i.e. transport of material between the surfaces and the adhesive medium. The same is true in the case of a chemical reaction, in which boundary layers arise. The aforementioned mechanisms can complement each other.

The impeller and/or a common vane is usually a part made of plastic material. If the surface of the motor does not consist of plastic material, a corresponding coating can be provided (or vice versa). It is also conceivable to treat or coat the contact surfaces of the motor and/or of the impeller hub with a material that promotes the adhesion to the adhesive medium. Likewise, a mechanical, physical or chemical treatment of the contact surfaces of the motor and/or of the impeller hub is possible, namely by roughening or contouring the surfaces. Accordingly, the use of tool marks to promote the adhesion is conceivable.

With regard to the introduction of the adhesive medium, it is advantageous for the contact surface of the impeller hub and/or of the motor to comprise at least one recess/notch, preferably in the form of a segmented or circumferential groove. Said recesses and/or notches serve for accommodating and possibly dosing the adhesive medium during the assembly, whereby it is possible in the easiest case to coat the contact surfaces with an adhesive medium and, in this condition, to push the impeller over the motor, whereby the recesses and notches of said embodiment serve for accommodation of the adhesive medium, namely in order to prevent the adhesive medium from being pushed away outwards while applying the impeller.

It is particularly advantageous to provide at least one feed channel for the adhesive medium that exits into the recess or notch and/or in the annular space, preferably a feed channel that extends in axial direction. In the scope of said embodiment, it is conceivable to have the impeller be pushed onto the motor and then to have the adhesive medium be pressed through the feed channel into the intermediate space and/or annular space, specifically an appropriate volume thereof such that it does not leak out from the intermediate space. The dosage shall be adapted to match the volume of the annular space.

It is further advantageous, for the recess/notch and/or the feed channel and/or the intermediate space to comprise at least one ventilation that can also serve as an aspiration and/or suction channel. The ventilation can be provided in the form of a channel that leads outwards. It is conceivable in this context to have the adhesive medium be aspirated from a reservoir (not shown) through the feed channel into the intermediate space until all of the intermediate space is filled. Moreover, the injection of the adhesive medium can be supported and/or promoted by means of the aspiration channel.

With regard to the method, the underlying object is met by the features of independent patent claims 15 and 16.

Claim 15 claims a simple production process in that the impeller is being pushed onto the motor with at least some small amount of play, whereby the pushing can proceed against a limit stop on the motor that defines the position of the impeller hub.

The contact surface of the motor and/or the contact surface of the impeller should have been cleaned before pushing the impeller onto the motor. The adhesive medium is applied onto the cleaned surface of all or part of preferably both, but at least of one, of the two contact surfaces using an appropriate amount such that little or no adhesive medium leaks from the intermediate space when the impeller is pushed onto the motor.

It is also conceivable to have the impeller be centred while it is being pushed onto the motor by providing internal ribs. Likewise, a ring-shaped transition fit can be plugged into the margin of the intermediate space in order to generate a centring. A transition fit of this type can be removed before, during or after the curing of the adhesive medium. The transition fit might just as well remain in the arrangement. The adhesive medium cures over a period of time with or without an effect of the temperature.

In the scope of a particularly sophisticated variant for production of the arrangement according to the invention, the motor is held, preferably in vertical orientation, by a workpiece carrier. The impeller is then pushed onto the motor also in vertical direction, and this is done with some defined play that defines the intermediate space between the impeller and the motor. Advantageously, the contact surfaces of impeller and motor should be cleaned before pushing the impeller onto the motor.

The centring of the pushed-on impeller can take place by means of integral ribs or by designing the impeller such as to have a non-circular internal cross-section, according to the aforementioned explanations concerning the arrangement according to the invention. Likewise, it is possible to use a ring-shaped transition fit that effects a centring while the adhesive medium is being introduced into the intermediate space between the contact surfaces of the motor and of the impeller hub. In addition, the transition fit has a sealing effect, although the same can also be generated by an integral ring seal, for example in the form of a sealing lip or the like.

The adhesive medium is preferably introduced through the impeller hub into the intermediate space by means of a feed channel, and an appropriate amount thereof is introduced such that no adhesive medium leaks from the intermediate space. No subsequent cleaning work is required.

If a transition fit was used, the same can be removed easily before or during the curing process. The curing process of the adhesive medium can take place under a temperature effect.

As has been mentioned above, the adhesive medium can be pressed and/or pushed and/or aspirated into the intermediate space as provided for by the details of the design. It is essential in any case that the intermediate space is filled with just the proper amount of adhesive medium as required to fill the intermediate space such that a secure torsion-proof connection between the impeller and the rotor is generated after curing.

Figure 2:
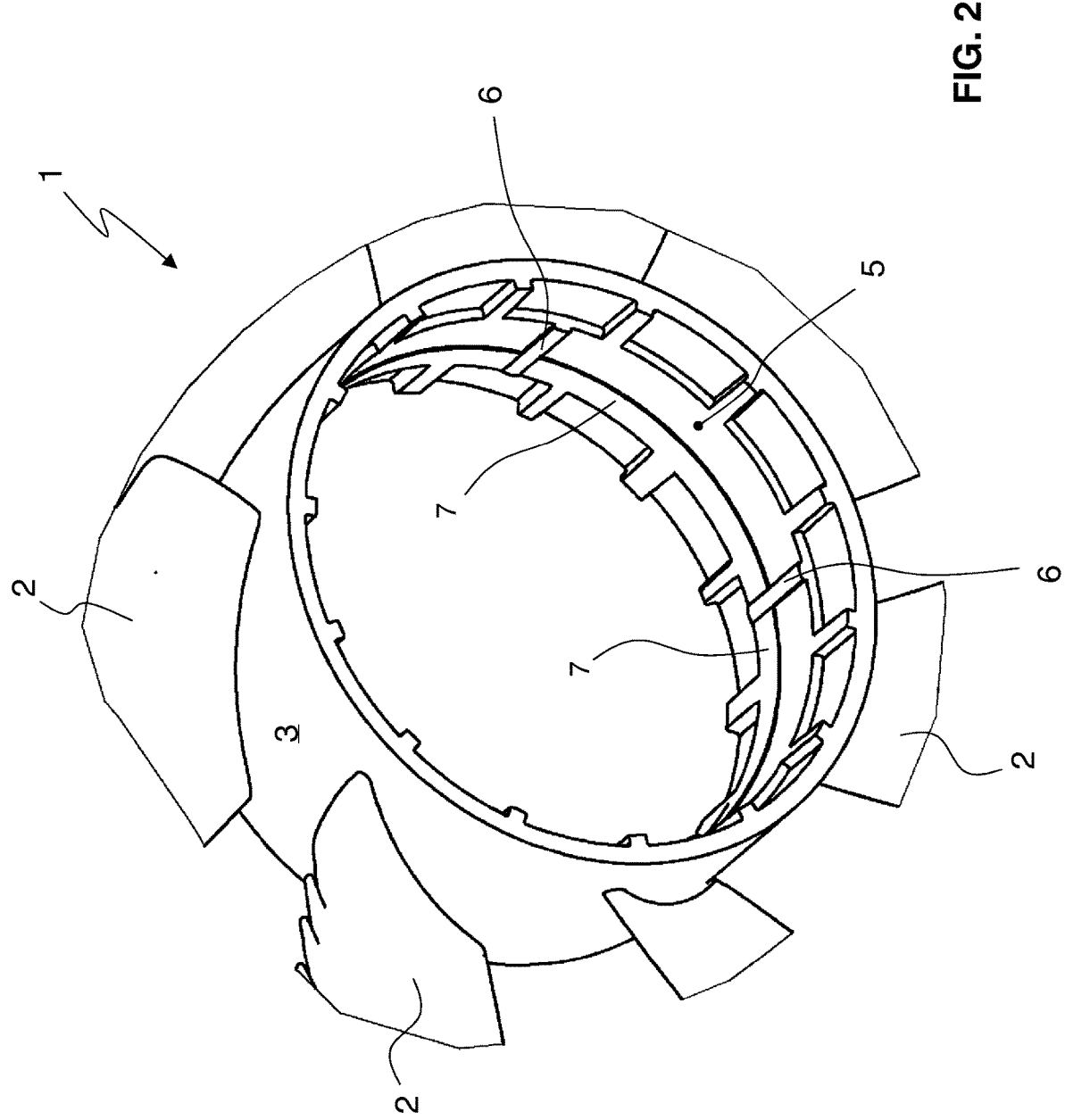
Figure 3:
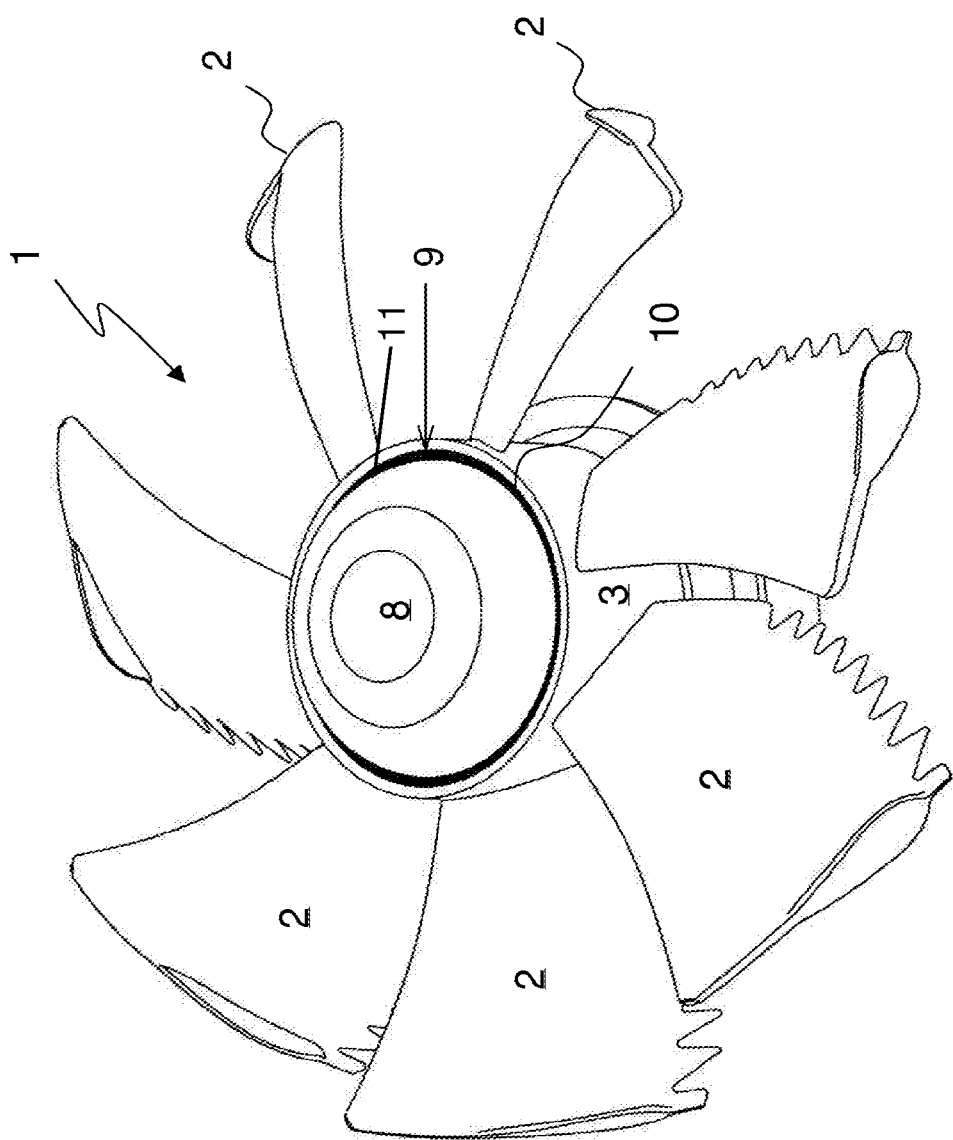

There are various ways of advantageous refinement and development of the teaching of the present invention. In this context, reference shall be made, on the one hand, to the sub-claims of patent claim 1 and, on the other hand, to the following illustration of an exemplary embodiment of the invention based on the drawing. Generally preferred refinements and developments of the teaching are also illustrated along with the explanation of the preferred exemplary embodiment of the invention based on the drawing. In the drawing, FIG. 1 shows a schematic view of an impeller according to the prior art that is provided with an integral sheet metal circular blank for definition of the requisite material tension while the impeller is pressed on;

FIG. 2 shows a schematic view of, part of, an impeller as shown in FIG. 1, but according to the invention, i.e. without a sheet metal circular blank; and FIG. 3 shows a schematic view of the arrangement of the impeller on an external rotor motor, whereby the intermediate space between the contact surfaces of impeller and external rotor motor is filled up with adhesive medium.

FIG. 1 shows a schematic view of the design of an impeller 1 known from the prior art, whereby this concerns a vane (axial impeller). The individual vanes 2 are integral component of a hub 3, whereby this altogether is an injection moulding part.

FIG. 1 clearly shows that hte hub 3 is provided with a metal sheet circular blank 4 that imparts on the hub 3 sufficient strength for force-locked pushing onto the external surface and/or contact surface of an external rotor motor that is not shown in FIG. 1. The metal sheet circular blank 4 is a separate component, which is produced in a progressive tool and is placed in the impeller tool before commencement of hte injection moulding process of the impeller 1. The metal sheet circular blank 4 produces the requisite tension and torsion-proof connection between the pressed-on impeller and the external rotor of the external rotor motor (8).

FIG. 2 shows the impeller 1 of an arrangement according to the invention in detail. It differs from the depiction according to the prior art according to FIG. 1 in that no metal sheet circular blank 4 is provided. Instead, the impeller 1 has a somewhat larger internal diameter as compared to the external rotor motor 8, namely in order to generate, by a given play, an intermediate space that is provided as an annular space 9 and serves for accommodation of an adhesive medium 10. Accordingly, the impeller 1 according to FIG. 2 is provided with contact surfaces 5 that serve as adhesive surfaces.

Moreover, the impeller 1 shown in FIG. 2 comprises fins 6 that serve for centring and sealing surfaces 7 that are aimed to prevent the adhesive medium 10, in particular glue, from being pushed out of the annular space 9.

FIG. 3 shows a schematic view of the entire arrangement of the impeller 1 on an external rotor motor 8, whereby the figure only indicates that an annular space 9 filled with adhesive medium 10, namely a suitable glue, is formed between the impeller 1 and the external rotor motor 8. A secure torsion-proof adhesive connection between the impeller 1 and the contact surface 11 of the external rotor motor 8 is established. The fins 6 shown in FIG. 2 serve for centring.

Referring to further advantageous refinements of the device according to the invention, reference shall be made to the general part of the description and the appended patent claims in order to avoid repetitions.

And lastly, it shall be noted explicitly that the exemplary embodiment of the device according to the invention described above only serves for illustration of the claimed teaching, but does not limit said teaching to the exemplary embodiment.

LIST OF REFERENCE NUMBERS

1 Impeller
2 Vane
3 Impeller hub, hub
4 Sheet metal circular blank
5 Contact surface
6 Fin, centring fin
7 Sealing surface
8 Rotor (of the motor), external rotor (of the external rotor motor)
9 Intermediate space, annular space
10 Adhesive medium

The invention claimed is:

1. An arrangement of an impeller on an electrical motor, whereby a torque of the motor is transferred to the impeller by means of a torsion-proof connection between a rotor of the motor and the impeller and/or an impeller hub, wherein the connection between the rotor of the motor and the impeller and/or the impeller hub results from physical and/or chemical interactions between an adhesive medium and contact surfaces of the impeller hub and of the motor, which face each other, wherein the adhesive medium fills, at least partially, an annular ring space that is formed between a contact surface of the impeller and a contact surface of the motor; wherein the annular ring space is sufficiently large to allow the annular ring space to take up the adhesive medium in order to securely transfer forces that arise between the impeller and the motor; wherein the torsion-proof connection between the rotor of the motor and the impeller and/or the impeller hub is a secure torsion-proof adhesive connection; and wherein axial-centring fins are provided on the contact surface of the impeller hub.

2. The arrangement according to claim 1, characterised in that the annular ring space formed between the impeller and the motor is a gap in the range of 0.05 mm to 3 mm.

3. The arrangement according to claim 1, characterised in that the axial-centring fins provided on the contact surface of the impeller hub comprise at least three axial-centring fins.

4. The arrangement according to claim 1, characterised in that the axial-centring fins define an imaginary internal surface with approximately the same diameter or a smaller diameter than the motor such that they are deformed, at least to a small degree, when the impeller is pushed onto the motor.

5. The arrangement according to claim 1, characterised in that the impeller hub has an internal cross-section that deviates from a circular ring-shaped internal cross-section, whereby edges thus formed serve for centring on the motor, and corners are filled, at least partially, with the adhesive medium.

6. The arrangement according to claim 1, characterised in that at least one sealing surface is provided on the contact surface of the impeller.

7. The arrangement according to claim 1, characterised in that the connection by means of the adhesive medium is provided such as to exist over the entire contact surfaces or in part and/or in zones of an intermediate space.

8. The arrangement according to claim 1, characterised in that the adhesive medium is a glue that forms a connection to the contact surfaces by means of adhesion and/or diffusion and/or chemical reaction.

9. The arrangement according to claim 1, characterised in that the contact surface of the motor and/or the contact surface of the impeller hub is treated or coated with a material that promotes adhesion to the adhesive medium or is impacted by flame treatment.

10. The arrangement according to claim 1, characterised in that the contact surfaces of the impeller hub and/or of the motor is/are roughened.

11. The arrangement according to claim 1, characterised in that the contact surfaces of the impeller hub and/or of the motor comprise at least one recess/notch, in the form of a segmented or circumferential groove, that serve for accommodating and possibly dosing the adhesive medium during the assembly.

12. The arrangement according to claim 11, characterised in that at least one feed channel for the adhesive medium that exits into the recess or notch and/or in an intermediate space, is provided.

13. The arrangement according to claim 12, characterised in that the recess/notch and/or the feed channel and/or the intermediate space comprise(s) at least one ventilation or one aspiration channel.

14. A method for producing the arrangement of the impeller on the electrical motor, as claimed in claim 1, whereby the torque of the motor is transferred to the impeller by means of the torsion-proof connection between the rotor of the motor and the impeller and/or the impeller hub, characterized by the following procedural steps: curing the adhesive medium.

15. A method for producing the arrangement of the impeller on the motor, as claimed in claim 1, characterised by the following procedural steps: whereby the torque of the motor is transferred to the impeller by means of the torsion-proof connection between the rotor of the motor and the impeller and/or the impeller hub, comprising: curing the adhesive medium under the effect of temperature.

16. The method according to claim 15, characterised in that the adhesive medium is being pressed and/or pushed and/or aspirated into an intermediate space.

* * * * *